United States Patent
Zhang

(10) Patent No.: US 12,232,655 B2
(45) Date of Patent: Feb. 25, 2025

(54) HANDLE MOUNTING STRUCTURE FOR AIR FRYER AND AN AIR FRYER

(71) Applicant: NINGBO CARELINE ELECTRIC APPLIANCE CO., LTD., Zhejiang (CN)

(72) Inventor: Yichi Zhang, Zhejiang (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 100 days.

(21) Appl. No.: 17/728,507

(22) Filed: Apr. 25, 2022

(65) Prior Publication Data

US 2023/0032181 A1 Feb. 2, 2023

(30) Foreign Application Priority Data

Jul. 30, 2021 (CN) .......................... 202121761138.5

(51) Int. Cl.
A47J 45/07 (2006.01)
A47J 37/06 (2006.01)

(52) U.S. Cl.
CPC ........... *A47J 45/07* (2013.01); *A47J 37/0641* (2013.01); *A47J 37/0664* (2013.01)

(58) Field of Classification Search
CPC .... A47J 45/07; A47J 37/0641; A47J 37/0664; B65D 2525/285; B65D 2525/287
USPC ....................................... 220/759
See application file for complete search history.

(56) References Cited

U.S. PATENT DOCUMENTS

| 1,920,330 | A | | 8/1933 | Towns | |
| 7,600,655 | B2 | * | 10/2009 | Agrawal | B29C 65/562 |
| | | | | | 215/396 |
| 2018/0177343 | A1 | | 6/2018 | Bonaccorso | |
| 2019/0290062 | A1 | | 9/2019 | Prieto et al. | |

FOREIGN PATENT DOCUMENTS

| CN | 113729515 A | * | 12/2021 | .......... A47J 37/0641 |
| DE | 19623617 A1 | | 12/1997 | |
| FR | 3106262 A1 | * | 7/2021 | .............. A47J 36/16 |
| KR | 20100087538 A | * | 8/2010 | |
| WO | WO-2017001191 A1 | * | 1/2017 | .......... A47J 37/0641 |

OTHER PUBLICATIONS

European Search Report issued in EP Application No. 22169572.9, dated Oct. 6, 2022, 3 pages.
Office Action issued in EP Application No. 22169572.9, dated Oct. 18, 2022, 6 pages.

* cited by examiner

*Primary Examiner* — J. Gregory Pickett
*Assistant Examiner* — Niki M Eloshway
(74) *Attorney, Agent, or Firm* — Dinsmore & Shohl LLP

(57) ABSTRACT

The present application provides a handle mounting structure for an air fryer and an air fryer. The air fryer includes a door panel and a handle, wherein the handle is separately mounted on the door panel. The handle mounting structure includes: a mounting groove, which is arranged on the door panel, wherein a first mounting member is provided on the mounting groove; and a mounting plate, arranged on the handle, wherein a second mounting member is provided on the mounting plate. At least one of the first mounting member and the second mounting member is an elastic element; and the first mounting member and the second mounting member abut against each other, to mount the handle onto the door panel.

6 Claims, 2 Drawing Sheets

HANDLE MOUNTING STRUCTURE FOR AIR FRYER AND AN AIR FRYER

CROSS-REFERENCE TO RELATED APPLICATION

The present disclosure claims the priority to the Chinese patent application filed with the Chinese Patent Office on Jul. 30, 2021 with the filing No. 2021217611385, and entitled "Handle Mounting Structure for Air Fryer and an Air Fryer", all the contents of which are incorporated herein by reference in entirety.

TECHNICAL FIELD

The present application relates to the technical field of kitchen appliances, and in particular, to a handle mounting structure for an air fryer and an air fryer.

BACKGROUND ART

With improvement of life quality, cooking equipment, such as, rice cookers, microwave ovens, electric kettles, and air fryers, etc., has become necessities of life. For ease of use, a handle is usually mounted on the top or side thereof, and the air fryer can be taken or opened through the handle. However, the existing handle is mounted by the manufacturer through fixing the handle in the door panel in advance before leaving the factory. The user, who does not need to mount it after purchase, may use it as required. However, with such handle mounted, the air fryer is bulky during transportation, which inevitably leads to the inconvenient packaging and high transportation costs.

SUMMARY

The present application provides a handle mounting structure for an air fryer and an air fryer, so as to solve the defects and problems of bulky volume, inconvenient packaging and high transportation costs of the existing air fryer during transportation.

In order to solve the above technical problems, the present application discloses a handle mounting structure for an air fryer. The air fryer comprises a door panel and a handle, wherein the handle is separately mounted on the door panel; and the handle mounting structure comprises:
 a mounting groove, arranged on the door panel, wherein a first mounting member is provided on the mounting groove; and
 a mounting plate, arranged on the handle, wherein a second mounting member is provided on the mounting plate,
 wherein at least one of the first mounting member and the second mounting member is an elastic element; and the first mounting member and the second mounting member abut against each other, to mount the handle onto the door panel.

In an optional embodiment, the first mounting member is a door panel rib, and the second mounting member is a handle retaining rib; and the door panel rib abuts against the handle retaining rib to fix the handle onto the door panel.

In an optional embodiment, the door panel rib is provided with a clamping table, and the handle retaining rib is provided with a limit protrusion; and the limit protrusion performs position limitation on the clamping table to prevent the mounting plate from moving.

In an optional embodiment, at least one end of the mounting groove is of a closing structure, for restricting the mounting plate from moving out in a direction in which the mounting groove extends.

In an optional embodiment, the handle mounting structure further comprises a limit assembly arranged on the mounting plate and/or the mounting groove, which is configured to prevent the mounting plate from moving out from an upper opening of the mounting groove.

In an optional embodiment, the limit assembly comprises:
 two grooves, respectively arranged on both sides of the mounting plate; and
 two door panel convex ribs, respectively arranged on two side walls of the mounting groove,
 wherein the two grooves respectively clamp corresponding door panel convex ribs to prevent the mounting plate from moving out from the upper opening of the mounting groove.

In an optional embodiment, the limit assembly comprises:
 two strip-shaped grooves, which are respectively arranged on contact surfaces of the mounting plate that are in contact with the mounting groove, and
 the mounting groove protrudes from the door panel; the two strip-shaped grooves clamp the two side walls of the mounting groove, respectively, so as to prevent the mounting plate from moving out from the upper opening of the mounting groove.

In an optional embodiment, one of the first mounting member and the second mounting member is a fixing hole, and the other one of the first mounting member and the second mounting member is an elastic claw hook; and the elastic claw hook is snapped into the fixing hole to mount the handle onto the door panel.

In an optional embodiment, an end of the handle is connected to the mounting plate to form a "η" shape or "D" shape.

In the second aspect, the present application provides an air fryer, comprising the handle mounting structure for the air fryer according to any one item of the above first aspect.

Compared with the prior art, the beneficial effects of the present application are as follows.

Since the first mounting member is provided in the mounting groove and the second mounting member is provided on the mounting plate in the present application, the mounting plate can be inserted into the mounting groove by the elastic force of the first mounting member or the second mounting member, and at the same time the second mounting member is snapped to a fixed position by using the resilience of the first mounting member or the second mounting member, such that the mounting plate cannot be pulled out from the mounting groove, thereby realizing the fixing and mounting of the handle. Therefore, after using this embodiment, it is not necessary to use screws to assemble the handle and the door panel into one piece before leaving the factory, but the handle can be placed in the frying basket assembly of the air fryer or in the gap of the package box. This structure will obviously facilitate the packaging and transportation of the air fryer, and the consumer can firmly assemble the handle onto the door panel of the air fryer only with a simple "inserting" action when in use, thus facilitating the packaging and transportation, and making the assembling fast and convenient, while maintaining the original functions.

REFERENCE NUMBERS door panel; 2. handle; 3. mounting groove; 4. mounting plate; 5. door panel rib; 6. handle retaining rib; 7. clamping table; 8. limit protrusion; 9. groove; 10. door panel convex rib; and 11. fixing hole.

DETAILED DESCRIPTION OF EMBODIMENTS

In order to make the above objects, features and advantages of the present application more clearly understood, the present application will be described in further detail below with reference to the drawings and embodiments.

In the related art, before the air fryer leaves the factory, the manufacturer will fix the handle into the door panel with screws in advance, and the user only needs to use it as required without mounting it after purchasing. However, with such handle mounted, the air fryer is bulky during transportation, which inevitably leads to inconvenient packaging and high transportation costs.

Therefore, in this embodiment, in order to reduce the volume of the air fryer during transportation, the handle is placed in the frying basket assembly of the air fryer or in the gap of the package box, and after the air fryer is transported to the user, the user mounts it by means of the mounting structure of the present application.

Embodiment 1

Figure 1:
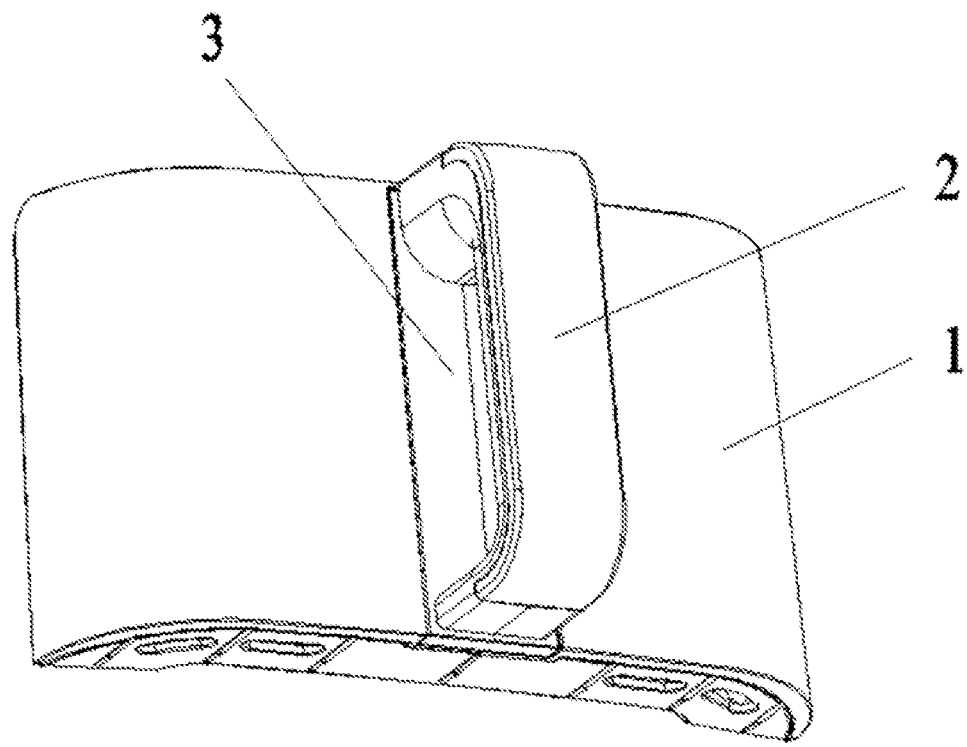
FIG. 1 is the structural schematic view of the handle mounting structure for the air fryer of the embodiment of the present application.
Figure 2:
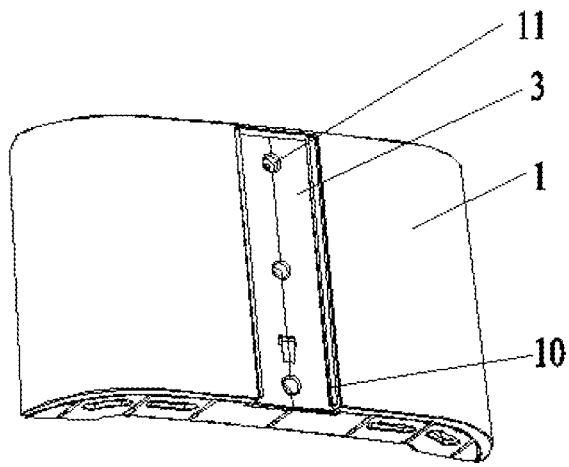
FIG. 2 is an exploded view of the handle mounting structure for the air fryer according to the embodiment of the present application.
Figure 2:
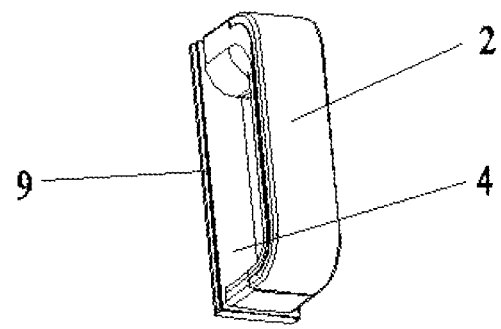
Figure 3:
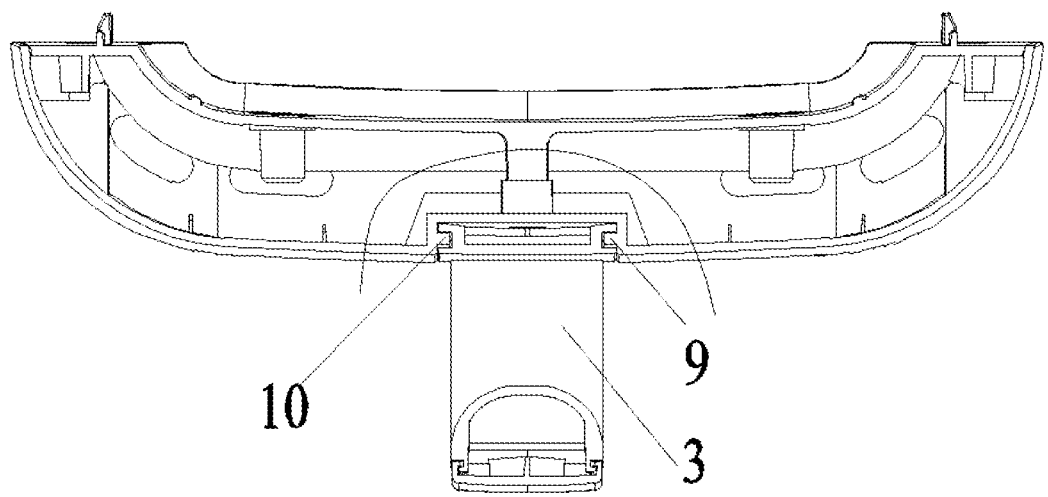
FIG. 3 is the mounting view of the handle mounting structure for the air fryer according to the embodiment of the present application.

Referring to FIG. 1, an embodiment of the present application shows a handle mounting structure for an air fryer. The air fryer comprises a door panel 1 and a handle 2, and the handle 2 is detachably mounted on the door panel 1. The handle mounting structure comprises: a mounting groove 3, which is arranged on the door panel 1, wherein the mounting groove 3 is provided with a first mounting member; a mounting plate 4, which is arranged on the handle 2, wherein a second mounting member is arranged on the mounting plate 4. Herein, at least one of the first mounting member and the second mounting member is an elastic element, and the first mounting member and the second mounting member abut to each other, so as to mount the handle 2 onto the door panel 1.

In this embodiment, the air fryer comprises a box body, a frying basket assembly, a door panel 1 and a handle 2. A cooking cavity is provided inside the box body, and the frying basket assembly is located in the cooking cavity. The door panel 1 is connected to the box body in a pushing-pulling mode. The handle 2 is, in a separating mode, mounted on the door panel 1 for opening or closing the cooking cavity. It should be noted that the separating mode here means that the two are separated during the transportation, and need to be assembled together during use, and they cannot be disassembled after being assembled.

In this embodiment, the mounting groove 3 may be arranged along the horizontal direction of the door panel 1, or may be arranged along the vertical direction of the door panel 1. The first mounting member is provided in the mounting groove 3. The first mounting member is an elastic element, which has a certain elastic force and resilience. The mounting plate 4 is provided thereon with a second mounting member, and the second mounting member is a rigid element. The second mounting member can abut against the first mounting member, thereby preventing the movement of the mounting plate 4. In this embodiment, the second mounting member and the first mounting member abut against each other, making the mounting plate 4 snapped to a fixed position, so that the handle 2 is then mounted on the door panel 1. During mounting, the mounting plate 4 is inserted into the mounting groove 3, and the mounting plate 4 is inserted into the mounting groove 3 by the elastic force of the first mounting member, and at the same time, the second mounting member is snapped to a fixed position by using the resilience of the first mounting member, so that the mounting plate 4 cannot be pulled out from the mounting groove 3, thus realizing the fixing and mounting of the handle 2.

It should be noted that, in this embodiment, it is also possible that the first mounting member is a rigid element, and the second mounting member is an elastic element; or both the first mounting member and the second mounting member are elastic elements. The process of the implementation is consistent with the above, which is not repeated here.

Compared with the prior art, the embodiments of the present application have the following beneficial effects.

Since the first mounting member is provided in the mounting groove 3 and the second mounting member is provided on the mounting plate 4 in this application, the mounting plate 4 can be inserted into the mounting groove 3 by the elastic force of the first mounting member or the second mounting member, and at the same time, the second mounting member is snapped to a fixed position using the resilience of the first mounting member or the second mounting member, so that the mounting plate 4 cannot be pulled out from the mounting groove 3, realizing the fixing and mounting of the handle 2. Therefore, after using this embodiment, it is not necessary to assemble the handle 2 and the door panel 1 into one piece with screws before it leaves the factory, but the handle 2 can be placed in the frying basket assembly of the air fryer or in the gap of the package box. This structure will obviously facilitate the packaging and transportation of the air fryer, and the user can firmly assemble the handle 2 onto the door panel 1 of the air fryer by only using a simple "inserting" action when in use. On the premise of maintaining the original functions, the packaging and transportation become convenient, and the assembly is fast and convenient.

In a feasible embodiment, the first mounting member is a door panel rib 5, and the second mounting member is a handle retaining rib 6. The door panel rib 5 and handle retaining rib 6 abut against each other, so as to fix the handle 2 onto the door panel 1.

In this embodiment, a door panel rib 5 is arranged on the mounting groove 3 at the position contacting with the mounting plate 4, and is arranged along the length direction of the mounting groove 3, and the door panel rib 5 has certain elastic force and resilience. A handle retaining rib 6 is provided on the mounting plate 4 at the position opposite to the door panel rib 5. The handle retaining rib 6 has a certain mechanical strength. The mounting plate 4 is inserted into the mounting groove 3 by using the elastic force of the door panel rib 5. The resilience of the door panel rib 5 can make the door panel rib 5 abut against each other, so that the mounting plate 4 is fixed into the mounting groove 3, and then the handle 2 is mounted onto the door panel 1. During mounting, the mounting plate 4 can be pushed into the mounting groove 3 from top to bottom or from bottom to top, or the mounting plate 4 can be put into the mounting groove 3 from the direction above directly. When the mounting plate 4 is pushed into the mounting groove 3, one end of the mounting groove is of an opening structure, and the mounting plate 4 is pushed therein through the opening structure.

It should be noted that, in the above embodiment, the door panel rib 5 can be integrally formed with the door panel 1, or the door panel rib 5 can be separately provided on the door panel 1. The handle retaining rib 6 can be integrally formed with the handle 2. Alternatively, the handle retaining rib 6 is provided separately on the handle 2. In the above-mentioned embodiment, it is also possible that the door panel rib 5 has a certain mechanical strength, and the handle retaining rib 6 has a certain elastic force and resilience. Alternatively, both the door panel rib 5 and the handle retaining rib 6 have a certain elastic force and resilience; and using the elastic force and resilience of both, the handle 2 is mounted onto the door panel 1.

In an optional embodiment, the door panel rib 5 is provided with a clamping table 7, and the handle retaining rib 6 is provided with a limit protrusion 8, and the limit protrusion 8 is limited on the clamping table 7 to prevent the mounting plate 4 from moving.

In this embodiment, the door panel rib 5 has a clamping table 7, due to which, the door panel rib 5 forms a structure with a wide upper part and a narrow lower part or a narrow lower part and a wide upper part. The handle retaining rib 6 has a limit protrusion 8, which makes the handle retaining rib 6 have the maximum width. During mounting, the limit protrusion 8 will be snapped onto the clamping table 7, and therefore, the mounting plate 4 will not move upwards or downwards.

In an optional embodiment, at least one end of the mounting groove 3 is of a closing structure, which is used to restrict the mounting plate 4 from moving out from the extending direction of the mounting groove 3.

Figure 4:
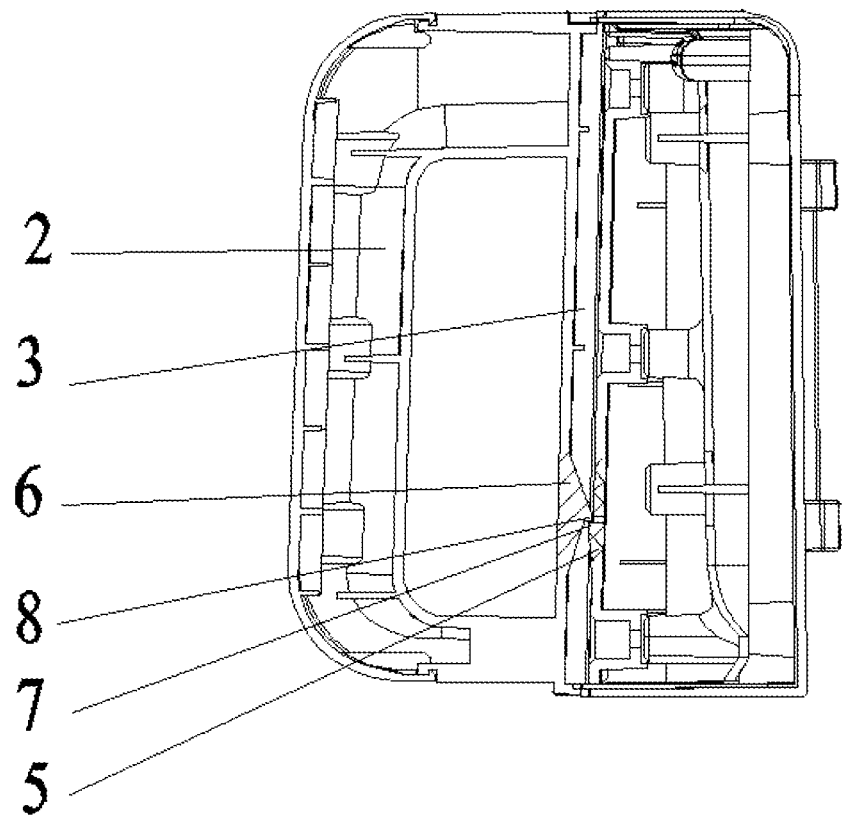
FIG. 4 is a sectional view of the handle mounting structure for the air fryer according to the embodiment of the present application.

In this embodiment, the mounting groove 3 has one end of the opening structure and the other end of the closing structure. Here, the opening structure is used to make one end of the mounting plate 4 snapped into the mounting groove 3, and the closing structure is used to prevent the mounting plate 4 from moving out from the end opening of the mounting groove 3. When the mounting plate 4 is pushed to move, the mounting plate 4 will not slide out from any of both ends of the mounting groove 3 (as shown in FIG. 4) due to the presence of the clamping table 7, the limit protrusion 8 and the closing structure. Of course, it is possible that both ends of the mounting groove 3 are of the closing structures, and at this time, the mounting plate 4 is snapped in from the front surface of the mounting groove 3.

In an optional embodiment, the handle mounting structure further comprises: a limit assembly disposed on the mounting plate 4 and/or on the mounting groove 3, and the limit assembly is used to avoid the mounting plate 4 from moving out from the upper opening of the mounting groove 3.

In this embodiment, the limit assembly is provided on the mounting plate 4 and/or the mounting groove 3, and the mounting plate 4 and the mounting groove 3 are stuck, so that the mounting plate 4 moves along a predetermined trajectory, so as to prevent the mounting plate 4 from sliding out from both sides of the mounting groove 3, that is, moving out from the upper opening of the mounting groove 3. Moreover, the provision of the limit assembly further strengthens the fixed relationship between the mounting groove 3 and the mounting plate 4, and avoids the handle 2 from separating from the door panel 1 during use.

In a feasible embodiment, the limit assembly comprises: two grooves 9, which are respectively provided on both sides of the mounting plate 4; and two door panel convex ribs 10, which are respectively provided at two side walls of the mounting grooves 3. The two grooves 9 respectively clamp the corresponding door panel convex ribs 10 to prevent the mounting plate 4 from slipping out of the mounting groove 3.

In this embodiment, two grooves 9 are respectively provided on both sides of the mounting plate 4, and door panel convex ribs 10 are respectively provided on the two side walls of the mounting groove 3, and the two door panel convex ribs 10 are respectively snapped into the corresponding grooves 9, which can reduce the gap between the mounting groove 3 and the mounting plate 4, so that when the mounting plate 4 is pushed, the mounting plate 4 will not slide out from the side of the mounting groove 3.

In another feasible embodiment, the limit assembly comprises two strip-shaped grooves, which are respectively disposed on the contact surfaces of the mounting plate 4 that are in contact with the mounting groove 3. The mounting groove 3 protrudes from the door panel 1. The two strip-shaped grooves clamp the two side walls of the mounting groove 3, respectively, so as to prevent the mounting plate 4 from slipping out of the mounting groove 3.

In this embodiment, two strip-shaped grooves are provided on sides of the mounting plate 4 which is in contact with the mounting groove 3, and the positions of the two strip-shaped grooves correspond to the two side walls of the mounting groove 3, respectively. Since the mounting groove 3 is higher than the door panel 1 by a certain height, the strip-shaped groove can be snapped into the side wall, so that when the mounting plate 4 is pushed, the mounting plate 4 will not slide out from the side of the mounting groove 3. Preferably, the height of the mounting groove 3 above the door panel 1 is equal to the depth of the strip-shaped groove, and the thickness of the side wall of the mounting groove 3 is equal to the width of the strip-shaped groove.

In another feasible embodiment, one of the first mounting member and the second mounting member is a fixing hole 11, and the other one of the first mounting member and the second mounting member is an elastic claw hook. The elastic claw hook is snapped into the fixing hole to mount the handle on the door panel.

In this embodiment, the first mounting member is a fixing hole 11 provided in the mounting groove 3, and the second mounting member is an elastic claw hook (not shown in the figure) disposed on the mounting plate 4, and the elastic claw hook has a certain amount of deformation. The number of the fixing holes 11 can be one, two or more than two, and the number of the elastic claw hooks can also be one, two or more. The numbers of the fixing holes 11 and the elastic claw hooks are equal to each other. Preferably, the numbers of the fixing holes 11 and the elastic claw hooks are 3, respectively. The three fixing holes 11 are arranged at equal intervals along the extending direction (length direction) of the mounting groove 3, and the positions of the three elastic claw hooks correspond to the positions of the three fixing holes 11. Since the elastic claw hook has a certain amount of deformation, it can be snapped into the fixing hole 11 by means of squeezing. After the elastic claw hook is snapped into the fixing hole 11, the elastic claw hook will be opened. The opened elastic claw hook will be clamped tightly by the fixing hole 11, so that the elastic claw hook cannot be pulled out from the fixing hole 11, thereby realizing the fixing and installation of the handle and the door panel.

It should be noted that this embodiment only shows a feasible fixing method, and the specific structure of the elastic claw hook is not the protection point of the present application. Therefore, no detailed description is given in this embodiment, as long as the handle and the door panel can be fixed once the elastic claw hook is snapped into the fixing hole.

In an optional embodiment, the end of the handle 2 is connected with the mounting plate 4 to form a "η" shape or a "D" shape.

In this embodiment, one end of the handle 2 is connected to one end of the mounting plate 4, and the other end of the handle 2 is a free end. At this time, the handle 2 and the mounting plate 4 form the "η" shape. When two ends of the handle 2 are respectively connected to two ends of the mounting plate 4, the handle 2 and the mounting plate 4 form a "D" shape. The handle mounting structure of the "η" shape or "D" shape" is more beautiful, so that users have the desire to buy.

Embodiment 2

This embodiment discloses an air fryer. The air fryer has the handle mounting structure of the air fryer according to any one item of Embodiment 1. Since this embodiment includes the handle mounting structure of the air fryer according to any one item of Embodiment 1, this embodiment has all the beneficial effects of Embodiment 1, which will not be repeated here.

In this embodiment, the air fryer comprises a door panel 1, a handle 2, a mounting groove 3 and a mounting plate 4. The handle 2 is separately mounted on the door panel 1; one end of the mounting plate 4 is connected to the handle 2, the mounting groove 3 is located on the door panel 1, and the handle 2 is mounted onto the door panel 1 through the mounting plate 4 and the mounting groove 3. Here, a first mounting member is provided on the mounting groove 3, and a second mounting member is provided on the mounting plate 4. At least one of the first mounting member and the second mounting member is an elastic element. The first mounting member and the second mounting member abut against each other to mount the handle 2 onto the door panel 1. During mounting, the mounting plate 4 is inserted into the mounting groove 3, and the mounting plate 4 is inserted into the mounting groove 3 by the elastic force of the first mounting member. At the same time, the second mounting member is snapped to a fixing position by the resilience of the first mounting member, so that the mounting plate 4 cannot be pulled out from the mounting groove 3, realizing the fixing and mounting of the handle 2.

Although the preferred embodiments of the embodiments of the present application have been described, those skilled in the art may make additional changes and modifications to these embodiments once knowing the basic inventive concepts. Therefore, the appended claims are intended to be construed to include the preferred embodiments as well as all changes and modifications that fall within the scope of the embodiments of the present application.

It should be noted that, in this specification, relational terms, such as first and second, are only used to distinguish one entity or operation from another entity or operation, and do not necessarily require or imply any actual relationship or sequence among these entities or operations. Moreover, the terms "comprise", include" or any other variation thereof are intended to encompass non-exclusive inclusion, such that a process, method, article or terminal device that comprises a list of elements comprises not only those elements, but also other elements not clearly listed, or also comprises the elements inherent to such a process, method, article or terminal equipment. Without further limitations, elements defined by the phrase "comprises a . . . " do not preclude the presence of additional identical elements in the process, method, article or terminal device comprising said elements.

The handle mounting structure of the air fryer and the air fryer provided by the present application have been described in detail above. The principles and embodiments of the present application are described with specific examples in this specification. The above description for the embodiments is only for being helpful to understanding the method of the present application and its core idea; and at the same time, for those generally skilled in the art, according to the idea of the present application, there would be changes in the specific implementation method and applied range. In summary, the content of this specification should not be construed as a limitation on the present application.

What is claimed is:

1. A handle mounting structure for an air fryer, the air fryer comprising a door panel and a handle, wherein the handle is separately mounted on the door panel; and the handle mounting structure comprises:
    a mounting groove, arranged on the door panel, wherein a first mounting member is provided on the mounting groove; and
    a mounting plate, arranged on the handle, wherein a second mounting member is provided on the mounting plate,
    wherein at least one of the first mounting member and the second mounting member is an elastic element; and the first mounting member and the second mounting member abut against each other, to mount the handle onto the door panel;
    wherein the first mounting member is a door panel rib, and the second mounting member is a handle retaining rib, wherein the door panel rib abuts against the handle retaining rib to fix the handle onto the door panel;
    wherein the door panel rib is provided with a clamping table, and the handle retaining rib is provided with a limit protrusion, wherein the limit protrusion performs position limitation on the clamping table to prevent the mounting plate from moving;
    wherein the handle mounting structure further comprises: a limit assembly arranged on the mounting plate and/or the mounting groove, wherein the limit assembly is configured to prevent the mounting plate from moving out from an upper opening of the mounting groove;
    wherein the limit assembly comprises:
        two strip-shaped grooves, which are respectively arranged on contact surfaces of the mounting plate that are in contact with the mounting groove,
    wherein the mounting groove protrudes from the door panel; the two strip-shaped grooves clamp two side walls of the mounting groove, respectively, so as to prevent the mounting plate from moving out from the upper opening of the mounting groove.

2. The handle mounting structure for an air fryer according to claim 1, wherein at least one end of the mounting groove is of a closing structure, for restricting the mounting plate from moving out in a direction in which the mounting groove extends.

3. The handle mounting structure for an air fryer according to claim 1, wherein the limit assembly comprises:

two grooves, respectively arranged on both sides of the mounting plate; and two door panel convex ribs, respectively arranged on two side walls of the mounting groove, wherein the two grooves respectively clamp corresponding door panel convex ribs to prevent the mounting plate from moving out from the upper opening of the mounting groove.

4. The handle mounting structure for an air fryer according to claim 1, wherein one of the first mounting member and the second mounting member is a fixing hole, and the other one of the first mounting member and the second mounting member is an elastic claw hook; and the elastic claw hook is snapped into the fixing hole to mount the handle onto the door panel.

5. The handle mounting structure for an air fryer according to claim 1, wherein an end of the handle is connected to the mounting plate to form a "η" shape or "D" shape.

6. An air fryer, comprising the handle mounting structure for an air fryer according to claim 1.

* * * * *